United States Patent [19]

Ott et al.

[11] Patent Number: 4,787,257

[45] Date of Patent: Nov. 29, 1988

[54] GEARSHIFT DEVICE

[75] Inventors: Dieter Ott, Ingolstadt; Klaus Bieber, Gaimersheim; Christian Dronia, Ingolstadt; Josef Maier, Hepberg, all of Fed. Rep. of Germany

[73] Assignee: Audi AG, Ingolstadt, Fed. Rep. of Germany

[21] Appl. No.: 37,274

[22] Filed: Apr. 10, 1987

[30] Foreign Application Priority Data

Apr. 24, 1986 [DE] Fed. Rep. of Germany ....... 3613854

[51] Int. Cl.⁴ .......................... G05G 9/12; G05G 5/04
[52] U.S. Cl. ..................................... 74/473 P; 74/476; 74/526
[58] Field of Search ..................... 74/473 P, 475, 476, 74/526

[56] References Cited

U.S. PATENT DOCUMENTS

| | | | |
|---|---|---|---|
| 1,143,794 | 6/1915 | Swenson et al. | 74/475 |
| 2,900,836 | 8/1959 | Gleeson et al. | 74/526 X |
| 4,078,449 | 3/1978 | Kelly | 74/526 X |

FOREIGN PATENT DOCUMENTS 2622282 12/1977 Fed. Rep. of Germany.
2460769 5/1980 Fed. Rep. of Germany.

*Primary Examiner*—Allan D. Herrmann
*Attorney, Agent, or Firm*—Reed Smith Shaw & McClay

[57] ABSTRACT

In a gearshift device, especially in a motor vehicle, for shifting the speeds of a transmission, with a bearing bracket with a ball joint cup that receives a ball joint sphere mounted on a gearshift lever pivotable in two planes, stops mounted on the gearshift lever and fixed stops in the area of the ball joint sphere are provided, an imaginary line connecting which runs through the central area of the ball joint sphere, one pair of stops being provided with a rounded element for rolling on the other pair of stops. An adjusting plate formed on the bearing bracket is pivotably mounted in the fastening area with a base plate, in one pivot plane (preselection plane) of the gearshift lever.

6 Claims, 2 Drawing Sheets

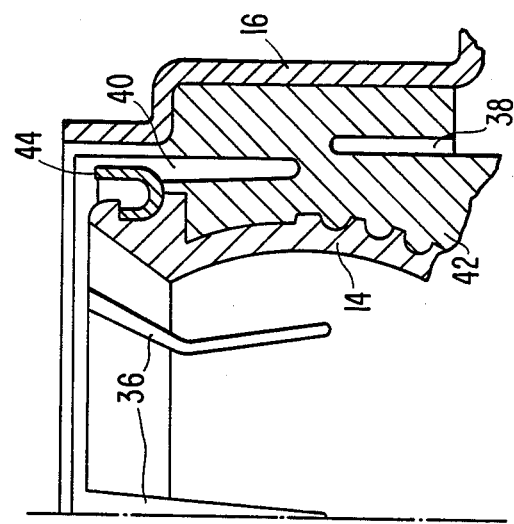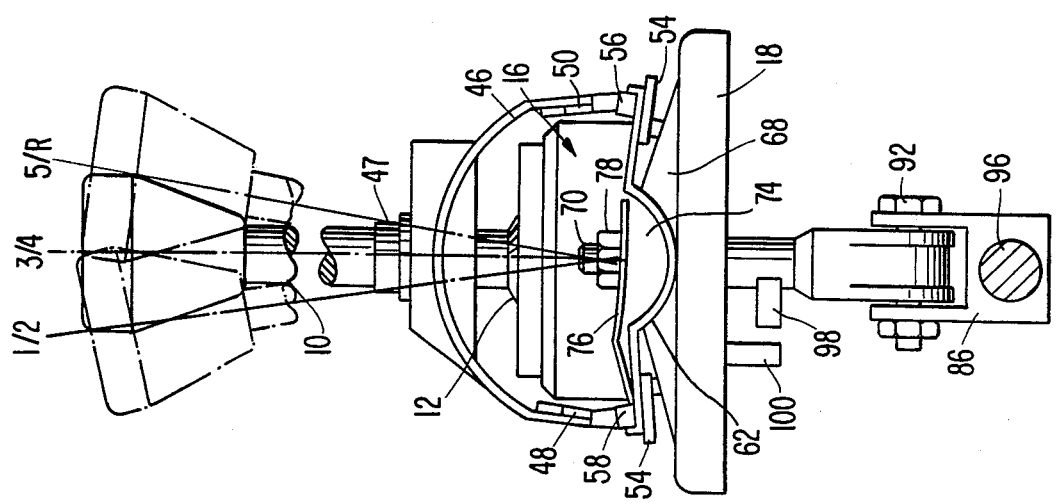

GEARSHIFT DEVICE

BACKGROUND AND DISCUSSION OF THE INVENTION

The invention relates to a gearshift device, especially in a motor vehicle, for shifting the speeds of a transmission. A gearshift lever pivotable in two planes carries a sphere for cooperation with a ball joint cup. The gear shift lever has a stop or detent mechanism which cooperates with complementary fixed position in the vicinity of the cup. The gearshift lever is constrained to move in two planes with the pivot angle being limited in each plane.

In a gearshift device disclosed in DE-PS [German Patent] No. 24 60 769, the detents or stops defining the angle of traverse in one plane are fastened on the lower end of the gearshift lever. These stops on the gearshift lever operate in conjunction with counter-stops provided in a shift-lever cover. As a result, when the gearshift lever pivots in the other plane, that is, when the transmission is shifted, the detents pivot along a circular path. Should a large transverse force be exerted during shifting, this could result in a certain tightness, along with wear between the detents. In addition, great care must be exercised in adjusting the pivot angle in one plane of the gearshift lever (preselection plane) relative to the shift rod connected to the gearing, because of the separation of the stops in space from the center of the ball joint sphere and accordingly the bearing bracket.

Consequently, the object of the invention is to develop a switchgear of its class that under all conditions is smooth-running, more wear-resistant, and simpler from the viewpoint of adjustment of the gearshift lever pivot angle.

This object is achieved with the characteristics of the invention described herein. In the invention, the movable stops on the gearshift lever and the fixed stops are thus so positioned in the area of the ball joint sphere that they roll over each other when the gearshift lever pivots in one plane (the shift plane). This means that only very slight friction occurs during such pivoting. A smooth-running, wear-minimized gearshift device is accordingly obtained. In addition, the adjustability of the pivot angle is improved as a result of positioning the stops in the immediate vicinity of the ball joint sphere, because it can be ascertained immediately by visual inspection of the stops whether the pivot angle of the shift lever more or less coincides with the torsion angle of the shift rod provided by the design.

More specifically, the stops mechanism includes a shackle surrounding the ball joint sphere at a distance through an angle of about 180°. The shackle has a shell-like configuration with rounded elements at its ends and is secured in the vicinity of the ball joint sphere. This results in a reliably operating, technologically advantageous design where the ball joint sphere may be made of a strong, wear-resistant plastic material.

The fixed stops may be made up of elastic cushion plates, ones of plastic, for example, so that simplicity of manufacture is accompanied by elimination of the noise of impact occurring when the gearshift lever is pivoted. The cushion plates may be fastened to the adjusting plate by means of a clip connection, by fitting into retaining tabs formed on the adjusting plate, or by cementing.

The adjustability of the gearshift device in the stop plane (preselection plane) can be further improved at low cost. A base plate cooperates with an adjusting plate of the bearing-bracket to permit adjustment in one pivot plane. The base plate has a curved portion whose center of curvature is coextensive with that of the sphere. This permits adjustment of the pivot angle relative to the base plate by means of displacement about the axis of curvature. In operation, after the fastener has been loosened, the adjusting plate together with the shift lever can be pivoted, thus making it especially simple to establish the pivot angle to be set relative to the shift rod. The process is one in which the gearshift lever is first displaced as far as possible to one of the end stops of the pivot angle and is then pivoted in the other direction for purposes of adjustment until both a stop on the shift rod from the direction of the transmission and a stop on the gearshift lever side between the gearshift lever and the adjusting plate is reached. If the adjusting plate is fastened in this position, it is easy to make certain that the pivot angle of the gearshift lever has been set properly in the stop plane for operation relative to the torsion angle of the shift rod or relative to a base plate. The base plate may be either a section of the bottom plate of the vehicle or a separate base plate to be fastened on the bottom plate.

The above is a brief discussion of some deficiencies of the prior art and features of the invention which overcome these deficiencies.

An embodiment of the invention is discussed in detail in what follows. The schematic drawing shows in

BRIEF DESCRIPTION OF THE DRAWINGS

FIG. 2 is a view of the gearshift device perpendicular to the pivot plane bounded by the stops.

FIG. 3 is a partial section through the ball joint cup of the bearing bracket which receives the ball joint cup.

DETAILED DESCRIPTION OF THE PREFERRED EMBODIMENT

Figure 1:
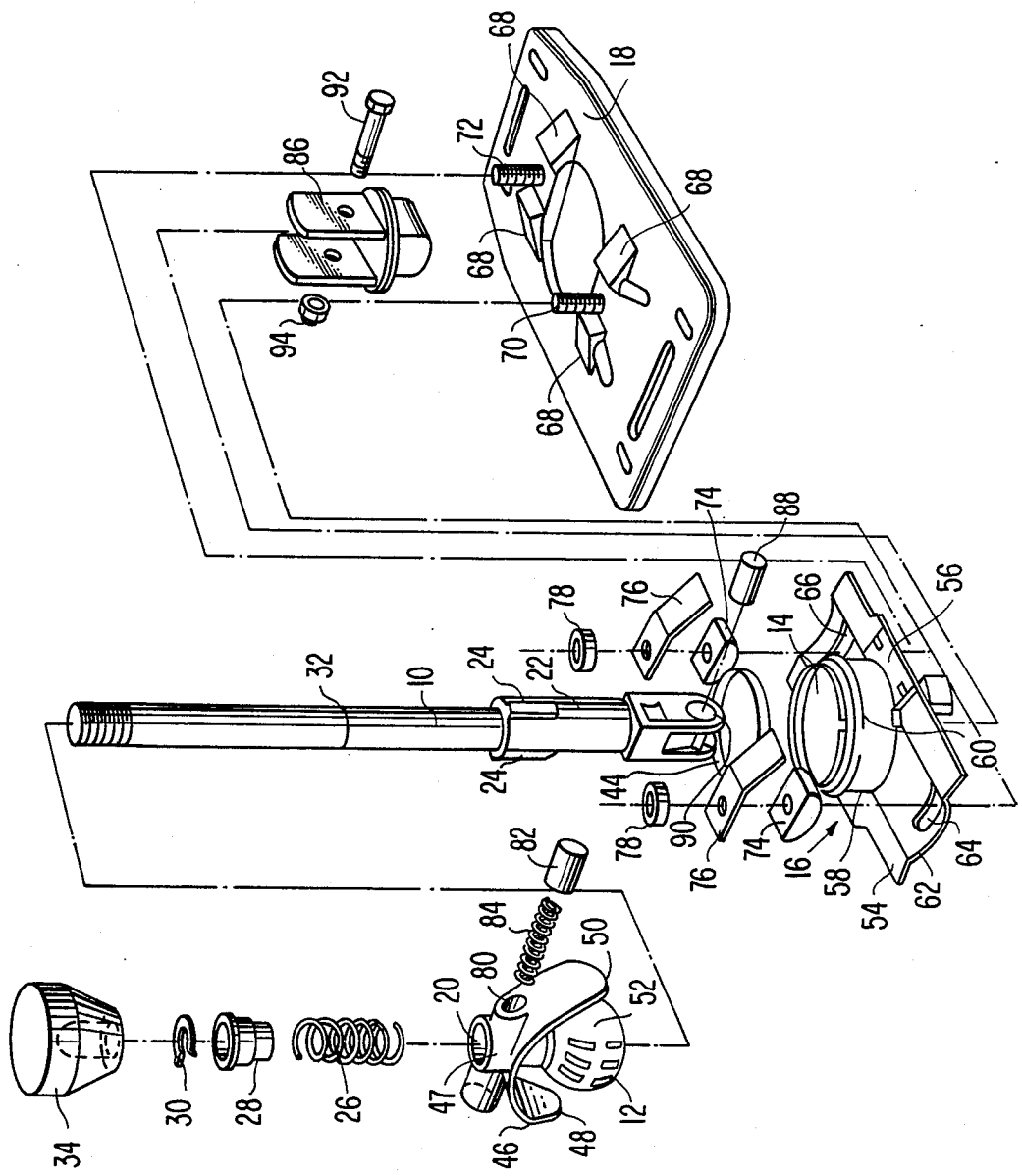
FIG. 1 is a three-dimensional representation of the gearshift device in the disassembled state.

The gearshift device for changing the speeds of a speed change gear as shown consists essentially of a gearshift lever 10, a ball joint sphere 12, a ball joint cup 14 of a bearing bracket 16 receiving the ball joint cup, and a base plate 18. The base plate may be fastened to the bottom plate of a vehicle by means of bolts not shown.

The ball joint sphere 12 is provided with a central hole 20 and may be inserted into a section 22 of greater diameter of the gearshift lever 10. There are provided on section 22 projections 24 extending axially which, in conjunction with corresponding grooves (not shown) in the central hole 20 of the ball joint cup 12, provide protection against torsion. The ball joint sphere 12 is fixed axially on the gearshift lever 10 by means of a helical spring 26, an additional guide sleeve 28, and a guard ring 30 that engages in a groove 32 in the gearshift lever 10. Lastly, a shift knob 34 is screwed onto the end of the gearshift lever 10.

The plastic shift knob or sphere 12 is forced into the ball joint cup 14 (see FIG. 3), for which purpose the ball joint cup 14 is provided with several slots 36 permitting expansion. The ball joint cup is embedded in an annular rubber bearing 42 provided with recesses 38, 40 that weaken the material, which rubber bearing 42 in turn is fastened in bearing bracket 16. The ball joint cup 14, the rubber bearing 42, and the bearing bracket 16 can be joined by vulcanization. A metal spring washer 44 clip-mounted in the ball joint cup 14 after installation of the ball joint sphere 12 ensures firm, zero-play support of the ball joint sphere 12.

A shackle stop spanning an angle of approximately 180° and forming two detents each provided with a rounded element 48, 50 is molded on a shell-like attachment 47 to the ball joint sphere 12. These stops define the pivot angle on the gearshift lever side in one pivot plane (preselection plane) of the gearshift lever 10. An imaginary connecting line (broken line 52) between these detents 48, 50 runs more or less through the center of the ball joint sphere 12.

In addition, fixed stops formed by elastic cushion plates 56, 58 are provided on the adjusting plate 54 formed on both sides of the ball joint cup 14 on the bearing bracket 16. An imaginary line connecting these two fixed stops 56, 58 (broken line 60) also runs more or less through the center of the ball joint sphere 12.

The adjusting plate 54 is provided with a curved section 62 extending perpendicular to the pivot plane of the gearshift lever 10 defined by stops 58, 56, in which curved section a longitudinal hole 64, 66 has been made on both sides of the ball joint cup 14 in the direction of curvature. The curved section 62 rests on ribs 68 extending above the base plate 18 and is held fast by threaded bolts 70, 72 extending through the longitudinal holes 64, 66, in conjunction with shims 74, spring blades 76, and nuts 78. By means of the curved section 62 the adjusting plate 54 can be moved relative to the base plate 18, the pivot axis being positioned in the center respectively of the ball joint cup 14 and the ball joint sphere 12.

Above the shackle stop 46, the shell-like attachment 47 is additionally provided with a transverse opening 80 into which a plunger pin 82 with a compression spring 84 is inserted. The plunger pin 82, which works in conjunction with a projection 24 on the gearshift lever 10, forms an axial safety lock between the ball joint spheee 12 and the gearshift lever 10; however, it allows axial displacement, for example, for engagement of a reverse gear, after application of a definite force vertically on the gearshift lever 10.

A U-shaped articulated element 86 is fastened on the lower, free end of the gearshift lever 10 by means of a bolt 92 with nut 94 extending through the articulated element and a bearing bush 88 in a hole 90 in the gearshift lever. The shift rod 96, not shown in further detail, is connected to this articulated element 86 forming a fork joint (see FIG. 2), said shift rod being connected to the transmission of the motor vehicle.

A certain amount of play or spacing which determines the pivot angle of the gearshift lever 10 in one pivot direction and accordingly in the preselection plane is provided between the stops 48, 50 of the shackle detent 46 and the stops 56, 58 formed by the cushion plate. For example, the first and second speeds of the transmission can be engaged by pivoting the gearlever 10 shown in FIG. 2 to the left until it comes to rest against the two detents 48, 58. The shifting movement in this instance takes place in a plane perpendicular to the preselection plane. In the process, the detent provided with rounded element 48 rolls on the detent 58 or cushion plate 58 without friction, because of its position more or less in the center of the ball joint sphere 12. None of the detents is in operation in the central position illustrated for engagement of the third and fourth speeds, in which situation the central position may be defined by a spring not shown that grips the shift rod 96.

Pivoting the gearshift lever 10 into the opposite end position of the preselection plane permits engagement of the fifth speed and reverse gear, the stop 50 and accordingly the rounded element 50 rolling on the fixed cushion plate 56. Beneath the base plate 18, another stop 98 is provided on the gearshift lever 10, which stop, in conjunction with a fixed stop 100, allows engagement of reverse gear only if the two stops 98, 100 have been disabled through axial displacement of the gearshift lever 10 downward relative to the ball joint sphere 12.

If the gearshift device or the pivot angle of the gearshift lever 10 are to be adjusted in the preselection plane, the two nuts 78 are first loosened. As a result, the adjusting plate 54 can be pivoted relative to the base plate 18 with the gearshift lever, whereby the pivot angle of the gearshift elver 10 relative to the torsion angle of the gearshift lever shaft 96 can easily be adjusted. The spring blades 76 serve to facilitate adjustment, in that they pretension the adjusting plate 54 into a position keeping the two stops in contact, after the nuts 78 have been loosened.

It goes without saying that a protective sleeve covering the shifting device is provided both above and below the base plate 18. The rounded elements provided on the shackle detent 46 could also be provided on the fixed stops 56, 58, in which case the shackle stop 46 would be provided with flat stop surfaces.

What is claimed:

1. A gearshift device in a motor vehicle for shifting the speeds of a transmission comprising:
   (a) a gearshift lever pivotable in two planes and mounted on a ball joint sphere;
   (b) said gearshift lever having two movable stops;
   (c) a bearing bracket cup for receiving at least a portion of said ball joint sphere;
   (d) two pair of fixed stops each pair fixed with respect to said cup and cooperating with said movable stops to limit the pivot angle of said lever in one of said planes;
   (e) said movable stops provided with an element for rolling on the fixed stops; and
   (f) said movable stops being colinear with a line passing through the center of said sphere and each of said pair of fixed stops being colinear with said line when engaged with said movable stops.

2. A gearshift device as claimed in claim 1, wherein the stops on the gearshift lever (48, 50) include a shackle stop surrounding the ball joint sphere at a distance through an angle of approximately 180°, the ends of said shackle stop being provided with rounded elements.

3. A gearshift device as claimed in claim 2, wherein the shackle stop is molded onto a shell-like attachment on the ball joint sphere.

4. A gearshift device according to claim 1 further comprising a bearing bracket for supporting said ball joint cup, an adjusting plate for adjusting the position of said cup, said fixed stops including elastic cushion plates mounted on said adjusting plate of the bearing bracket.

5. A gearshift device as claimed in claim 4, wherein said adjusting plate of the bearing bracket is pivotably mounted in one pivot plane of the gearshift lever.

6. The gearshift device according to claim 5 further comprising a base member for holding said bearing bracket, said adjusting plate being adjustably secured to said base member and having a curved section whose radius of curvature is coextensive with that of said ball joint sphere when located within said cup and said adjusting permitting adjustment of the pivot angle relative to said base plate established by the fixed stops by means of displacement about the control axis of curvature.

* * * * *